United States Patent [19]

Olschewski et al.

[11] Patent Number: 4,946,296
[45] Date of Patent: Aug. 7, 1990

[54] DEVICE FOR SEALING AND GENERATING ELECTRICAL PULSES

[75] Inventors: Armin Olschewski; Robert Stolz, both of Schweinfurt; Josef Stork, Gerolzhofen; Heinz Kiener, Waigolshausen; Georg Hochrein, Reichenbach, all of Fed. Rep. of Germany; Sven Benktander, Goteborg, Sweden; Henri Haller, Antony, France; Hendrikus J. Kapaan, Nieuwegein, Netherlands

[73] Assignee: SKF GmbH, Schweinfurt, Fed. Rep. of Germany

[21] Appl. No.: 325,310

[22] Filed: Mar. 17, 1989

[30] Foreign Application Priority Data

Mar. 24, 1988 [DE] Fed. Rep. of Germany ....... 3809904

[51] Int. Cl.$^5$ ............................................. F16C 19/06
[52] U.S. Cl. .................................... 384/448; 340/682
[58] Field of Search ............... 384/448, 484, 446, 485, 384/486; 340/682

[56] References Cited

U.S. PATENT DOCUMENTS

| | | | |
|---|---|---|---|
| 4,015,883 | 4/1977 | Taylor | 384/484 |
| 4,688,951 | 8/1987 | Guers | 384/448 |
| 4,778,286 | 10/1988 | Kadokawa | 384/448 |
| 4,783,180 | 11/1988 | Hayashi | 384/448 |

*Primary Examiner*—Lenard A. Footland
*Attorney, Agent, or Firm*—Eugene E. Renz, Jr.

[57] ABSTRACT

A device for sealing and generating electrical pulses in a bearing assembly including fixed and rotating bearing rings especially a wheel bearing for motor vehicles. The device consists of a sealing section on the fixed bearing ring with an embedded pulse generator for detecting rotational movement and a sealing section on the rotating bearing ring having cells a certain distance apart from each other which activate the pulse generator. The fixed bearing ring (4, 19) rotates with respect to the sealing section (2) which is secured against rotation by way of a machine element (1, 24), which holds the fixed bearing ring (4, 19).

4 Claims, 1 Drawing Sheet

DEVICE FOR SEALING AND GENERATING ELECTRICAL PULSES

FIELD OF THE INVENTION

The present invention relates to a device for sealing and generating electrical pulses in bearing assemblies, particularly wheel bearings for motor vehicles.

BACKGROUND OF THE INVENTION

Devices of the above type are not new per se. A typical example of a prior art device is that shown in Italian Patent Application No. 67,650A 87. This disclosure relates to wheels for motor vehicles and shows a bearing including a seal between the inner and outer rings which prevents the intrusion of foreign matter such as dirt and water. The seal comprises an outer sealing part secured by way of a sheet metal support sleeve to the outer ring and an inner sealing section attached by a sheet metal part to the inner ring. An elastic sealing element secured by vulcanization runs on a corresponding sealing surface of the sheet metal part. Additionally, the seal incorporates a pulse generator which transmits a plurality of electrical pulses for each revolution of the wheel which are the pulses required by the anti-locking systems for the brakes. The system described forms an advantageous combination of a seal and a pulse generator. The pulse generator can be mounted on either the outer ring or the inner ring depending on the application in question and which of the two rings rotates. For example, the pulse generator must be mounted on the stationary ring since the connecting lines do not permit it to rotate.

In general, it can be anticipated that the stationary bearing ring of a roller bearing will, during operation of the bearing, rotate to some degree by reason of the torque acting on it via the rolling elements. A defective fit or a change in the seating conditions of the stationary ring after prolonged periods of operation will result in the stationary ring wandering on its seating surface. As a result of this unintended rotational movement of the so-called stationary ring, the connecting lines of the known device would be severed since the sealing part in question is rigidly connected to the bearing ring and is thus rotated in the same direction. Severing of these lines of course renders the functioning of the anti-locking system inoperative.

SUMMARY OF THE INVENTION

With the foregoing in mind, it is an object of the present invention to provide a device for sealing and generating electrical pulses of the type discussed above, whereby the severing or breaking of the connecting lines is reliably prevented. To this end, in accordance with the present invention, the fixed bearing is freely rotatable relative to the sealing part and the sealing part is secured against rotation by means of a machine element which holds the fixed bearing ring. As noted above, the fixed bearing ring can be either the outer ring or the inner ring. For this reason, the kinematics of the seal are also reversed correspondingly. Thus the pulse generator can be mounted together with the sealing part either radially on the outside or radially on the inside. In either event, there is no connection which would prevent freedom of relative rotation between the bearing ring and the sealing part which carries the pulse generator. The sealing part itself is connected permanently, for example, to a corresponding seating surface of the housing, on the axle or other appropriate machine part. It is noted that the security with which the rotation is prevented must be high enough to ensure that an unintended wandering of the bearing ring in the peripheral direction exerts no effect on the sealing part, even if the two components rest against each other. The independently torsion-proofed sealing part in accordance with the present invention also retains the pulse generator rigidly in its position so that the lines which are connected to a fixed terminal part on the frame or chassis or not subjected to any loads. In this manner, the danger that the lines could be torn off is effectively eliminated.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
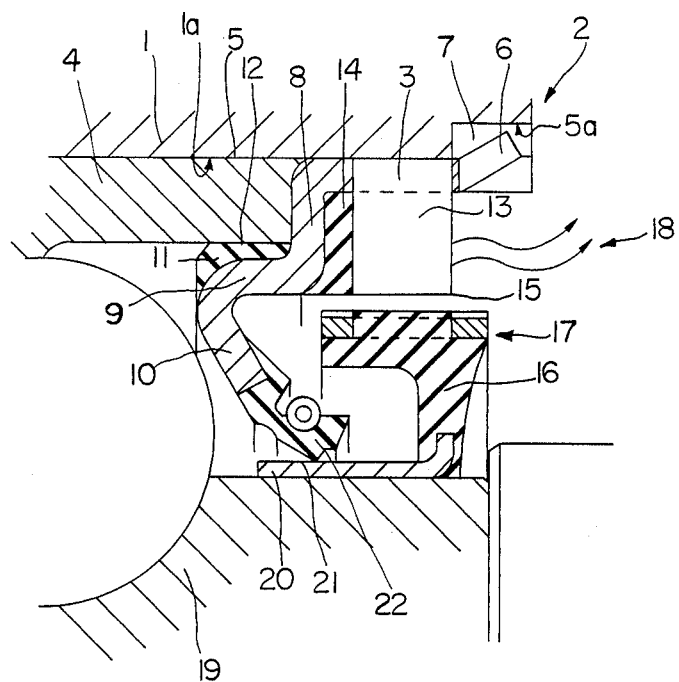
FIG. 1 is a partial longitudinal sectional view through a ball bearing having a rotating inner ring and a seal mounting a stationary pulse generator on the radially outwardly side thereof.

Referring now to the drawings, the ball bearings are only partially illustrated and are utilized as the wheel bearing for motor vehicles, for example. The bearing space between the axial ends is closed off in each case by seal means to prevent the intrusion of water and dust and other particulate matter. These seals are combined with a pulse generation system which supplies an electronic circuit (not shown) for an antilocking system, which in turn is operatively connected to the brakes of the individual wheels.

Referring now to the drawings, particularly FIG. 1 thereof, the sealing section of the bearing generally designated by the numeral 2 is mounted in a housing 1 connected to the chassis. The sealing section 2 includes a sheet metal reinforcing element 3 which is press-fitted into the bore 1a of the housing which also serves as a seating surface 5 for the outer ring 4 the bearing assembly. The sheet metal reinforcing element includes a tongue 6 extending radially from the outer peripheral edge of the sheet metal reinforcing element 3 and engaging in a notched recess 5a in the seating surface 5 of the housing 1. This interengagement of the tongue 6 in the notched recess 5a provides a positive form lock arrangement in the peripheral direction. As further illustrated in FIG. 1, on the outer ring side, there is an inwardly directed radial flange 8, a cylindrical section 9 and a conically shaped flange 10 extending from the inner end of the cylindrical section 9 and formed integrally therewith. The cylindrical section 9 has covering 11 made of elastic material stretched with the least possible amount of radial pretension over a shoulder surface 12 of the outer ring 4. This connection is intended merely to reduce the size of the wheel bearing before assembly.

Pulse generator 13 is inserted into sheet metal reinforcing element 3 and vulcanized into place by means of elastic material 14. Confronting the pulse generator 13 is a plastic ring 16 which has on its peripheral surface a rather large number of cells 17 made of a thorough magnetic material spaced a predetermined distance apart from each other. In a conventional manner, these cells 17 activate pulse generator 13 during their rotation and generate the electrical pulses in leads 18 emanating from the pulse generator 13. Ring 16 is connected to a sheet metal sleeve 20 supported on a land surface of the inner ring 19. The cylindrical lateral surface 21 of the sleeve 20 forms the contact surface for a sealing lip 22 vulcanized to the sheet metal element 3 and depending from the inner peripheral edge thereof.

In the installed state, it is possible for the outer ring 4 to turn with a small amount of friction over this connection when the ring moves unintentionally on its seating surface 5 in the peripheral direction; that is, if it should start to turn in somewhat of a creeping fashion. However, sealing section 2 remains reliably in its position and thus the danger of severing the connecting lines 18 is alleviated.

Figure 2:
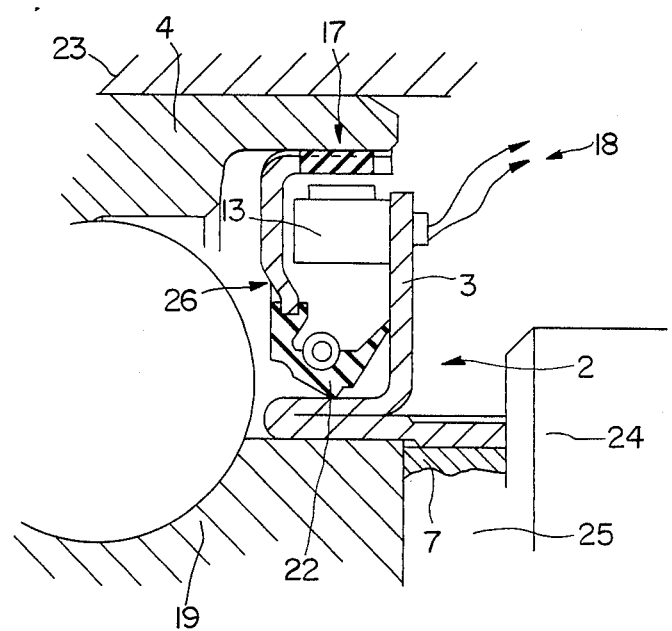
FIG. 2 is a partial longitudinal sectional view through a ball bearing with a rotating outer ring and a seal with a stationary pulse generator on the radially inwardly directed side thereof.

Turning now to the embodiment illustrated in FIG. 2, the outer ring for the bearing assembly is seated in a hub 23 and rotates therewith. Inner ring 19 is mounted on axle 24 which is connected to the chassis and material from sheet metal element 3 is bent to fit a recess 7 machined into the periphery of a shoulder 25 of the axle. Sheet metal element 3, an extension of which is then inserted into inner ring 19, is connected only radially thereto in a form-locking manner. When inner ring 19 rotates unintentionally on axle 24, sealing part 2 will not be carried along. The radially outer sealing section 26 is provided on its cylindrical seating part with ferromagnetic cells 17 distributed at intervals around its periphery, which cells activate pulse generator 13 during the rotation of the wheel bearing in the same way as in the example described above.

What is claimed is:

1. Device for sealing and generating electrical pulses in a bearing assembly including fixed and rotating bearing rings comprising of a sealing section on the fixed bearing ring with an embedded pulse generator for detecting the rotational movement and a sealing section on the rotating bearing ring having cells a certain distance apart from each other which activate the pulse generator, characterized in that the fixed bearing ring (4, 19) rotates with respect to the sealing section (2) and in that this part is secured against rotation by means of a machine element (1, 24), which holds the fixed bearing ring (4, 19).

2. Device according to claim 1,, characterized in that the sealing section (2) is secured against rotating by means of the machine element (1, 24) in a form-locking manner.

3. Device according to claim 1, characterized in that a sheet metal element (3), which supports the sealing section (2), has at least one projection (6) which extends in a form-locking manner into a corresponding recess (7) in the machine part (1, 24).

4. Device according to claim 1, characterized in that the fixed sealing section (2) is connected radially in a form-locking manner by way of an elastic covering (11) to the fixed bearing ring (4) and connected to said ring in the peripheral and axial directions in a slightly friction-locking manner.

* * * * *